United States Patent
Chun

(10) Patent No.: US 8,988,459 B2
(45) Date of Patent: Mar. 24, 2015

(54) METHOD AND APPARATUS FOR OPERATING A DISPLAY UNIT OF A MOBILE DEVICE

(75) Inventor: Jin Wook Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 12/949,066

(22) Filed: Nov. 18, 2010

(65) Prior Publication Data

US 2011/0115817 A1 May 19, 2011

(30) Foreign Application Priority Data

Nov. 19, 2009 (KR) .................. 10-2009-0111962

(51) Int. Cl.
| | | |
|---|---|---|
| G09G 5/14 | (2006.01) | |
| G06F 3/0481 | (2013.01) | |
| G06F 3/0482 | (2013.01) | |
| G06F 3/0486 | (2013.01) | |
| G06F 3/0488 | (2013.01) | |

(52) U.S. Cl.
CPC .......... *G06F 3/04817* (2013.01); *G06F 3/0482* (2013.01); *G06F 3/0486* (2013.01); *G06F 3/04886* (2013.01)
USPC ........................................................ 345/629

(58) Field of Classification Search
CPC ........................................................ G09G 5/00
USPC ........................................................ 345/629
See application file for complete search history.

(56) References Cited

U.S. PATENT DOCUMENTS

| | | | | |
|---|---|---|---|---|
| 6,333,973 | B1 * | 12/2001 | Smith et al. ................. | 379/88.12 |
| 7,057,372 | B2 * | 6/2006 | Chen et al. .................. | 320/106 |
| 7,233,127 | B2 * | 6/2007 | Chen et al. .................. | 320/106 |
| 7,441,207 | B2 * | 10/2008 | Filner et al. ................. | 715/864 |
| 7,508,388 | B2 * | 3/2009 | Barfuss et al. .............. | 345/418 |
| 7,872,640 | B2 * | 1/2011 | Lira ............................. | 345/173 |
| 7,877,703 | B1 * | 1/2011 | Fleming ...................... | 715/800 |
| 7,990,399 | B2 * | 8/2011 | Kang ........................... | 345/649 |
| 8,112,299 | B2 * | 2/2012 | Kim et al. ................... | 705/7.18 |
| 8,185,164 | B2 * | 5/2012 | Kim ............................ | 455/566 |
| 8,217,904 | B2 * | 7/2012 | Kim ............................ | 345/173 |
| 8,295,892 | B2 * | 10/2012 | Kim et al. ................... | 455/574 |
| 8,305,365 | B2 * | 11/2012 | Takata ......................... | 345/184 |
| 2005/0037814 | A1 * | 2/2005 | Yasui et al. ................. | 455/566 |
| 2005/0229111 | A1 * | 10/2005 | Makela ....................... | 715/802 |
| 2006/0026521 | A1 * | 2/2006 | Hotelling et al. ........... | 715/702 |
| 2006/0094480 | A1 | 5/2006 | Tanaka | |

(Continued)

FOREIGN PATENT DOCUMENTS

| | | | |
|---|---|---|---|
| CN | 1760822 A | 4/2006 | |
| CN | 1925658 A | 3/2007 | |

(Continued)

*Primary Examiner* — Javid A Amini
(74) *Attorney, Agent, or Firm* — Jefferson IP Law, LLP

(57) ABSTRACT

A method and apparatus that can display an additional display region in a display area on a display unit are provided. The method and apparatus are configured in such a way as to provide a display area and an additional display region. The display area is displayed on the display unit. The additional display region to be displayed on the display unit is virtually prepared. The additional display region is displayed on the display unit according to a detected signal output from the motion detector. The items displayed on the display area and the additional display region are associated with each other to perform a corresponding user function.

25 Claims, 5 Drawing Sheets

B : B1, B2, B3, B4
C : C1, C2, C3, C4

(56) References Cited

U.S. PATENT DOCUMENTS

| | | | |
|---|---|---|---|
| 2006/0183512 A1* | 8/2006 | Segawa et al. | 455/575.1 |
| 2006/0264244 A1* | 11/2006 | Choe et al. | 455/566 |
| 2007/0046630 A1 | 3/2007 | Hong et al. | |
| 2007/0180409 A1 | 8/2007 | Sohn et al. | |
| 2008/0051153 A1* | 2/2008 | Kang | 455/566 |
| 2009/0066533 A1 | 3/2009 | Park et al. | |
| 2009/0309830 A1 | 12/2009 | Yamamoto et al. | |
| 2010/0079696 A1* | 4/2010 | Hwu et al. | 349/57 |
| 2010/0088626 A1* | 4/2010 | Rubanovich | 715/773 |
| 2010/0124949 A1* | 5/2010 | Demuynck et al. | 455/569.1 |
| 2011/0179377 A1* | 7/2011 | Fleming | 715/779 |

FOREIGN PATENT DOCUMENTS

| | | |
|---|---|---|
| CN | 101013350 A | 8/2007 |
| CN | 101198925 A | 6/2008 |
| CN | 101578569 A | 11/2009 |
| JP | 2009-003799 A | 1/2009 |

* cited by examiner

B : B1, B2, B3, B4

C : C1, C2, C3, C4

METHOD AND APPARATUS FOR OPERATING A DISPLAY UNIT OF A MOBILE DEVICE

PRIORITY

This application claims the benefit under 35 U.S.C. §119(a) of a Korean patent application filed on Nov. 19, 2009 in the Korean Intellectual Property Office and assigned Serial No. 10-2009-0111962, the entire disclosure of which is hereby incorporated by reference.

BACKGROUND OF THE INVENTION

1. Field of the Invention

The present invention relates to mobile systems. More particularly, the present invention relates to a method and apparatus that can display an additional display region in a display area on the display unit, based on detected signals.

2. Description of the Related Art

In recent years, mobile devices have been widely used because they can be easily carried. For example, 85% of people in the Republic of Korea are using mobile devices because they allow users to make voice calls while moving. Conventional mobile devices may provide a variety of functions in addition to the function of communicating voice calls between callers. For example, the conventional mobile device often has a file playback function, such as a Moving Picture Experts Group Audio Layer 3 (MP3) player, and an image collecting function, such as a digital camera. The conventional mobile device can also support a function for playing a mobile game or an arcade game, etc.

Conventional mobile devices can create input signals via a variety of modes, for example, a touch screen, a keypad, etc. The touch screen creates input signals according to touch events. The keypad creates input signals when keys are operated.

Meanwhile, in order to retain the portability of mobile devices, the display unit installed in the mobile device is restricted in size. Therefore, a system is required that overcomes the limitation of the display area of the display unit and provides a user with the convenience to better use the mobile device.

SUMMARY OF THE INVENTION

An aspect of the present invention is to address at least the above-mentioned problems and/or disadvantages and to provide at least the advantages described below. Accordingly, an aspect of the present invention is to provide a method and apparatus that can prepare an additional display region, other than a display area on the display unit, and can output and remove the additional display region onto and from the display area on the display unit, based on a particular input signal.

In accordance with an aspect of the present invention, a method for operating a display unit of a mobile device is provided. The method includes: displaying a preset display area on a display unit, determining whether a detected signal is created while the display area is being displayed, and displaying, if a detected signal is created, a preset additional display region on the display unit.

In accordance with another aspect of the present invention, an apparatus for operating a display unit of a mobile device, including a motion detector for creating a detected signal according to the motion of the mobile device, a display unit for displaying a preset display area and selectively displaying a preset additional display region according to a preset detected signal output from the motion detector, and a controller for controlling the display unit to display or removed the additional display region on or from the display unit, according to the detected signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms or words used in the following description and claims are not limited to the bibliographical meaning, but, are merely used by the inventor to enable a clear and consistent understanding of the invention. Accordingly, it should be apparent to those skilled in the art that the following description of exemplary embodiments of the present invention is provided for illustration purposes only, and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
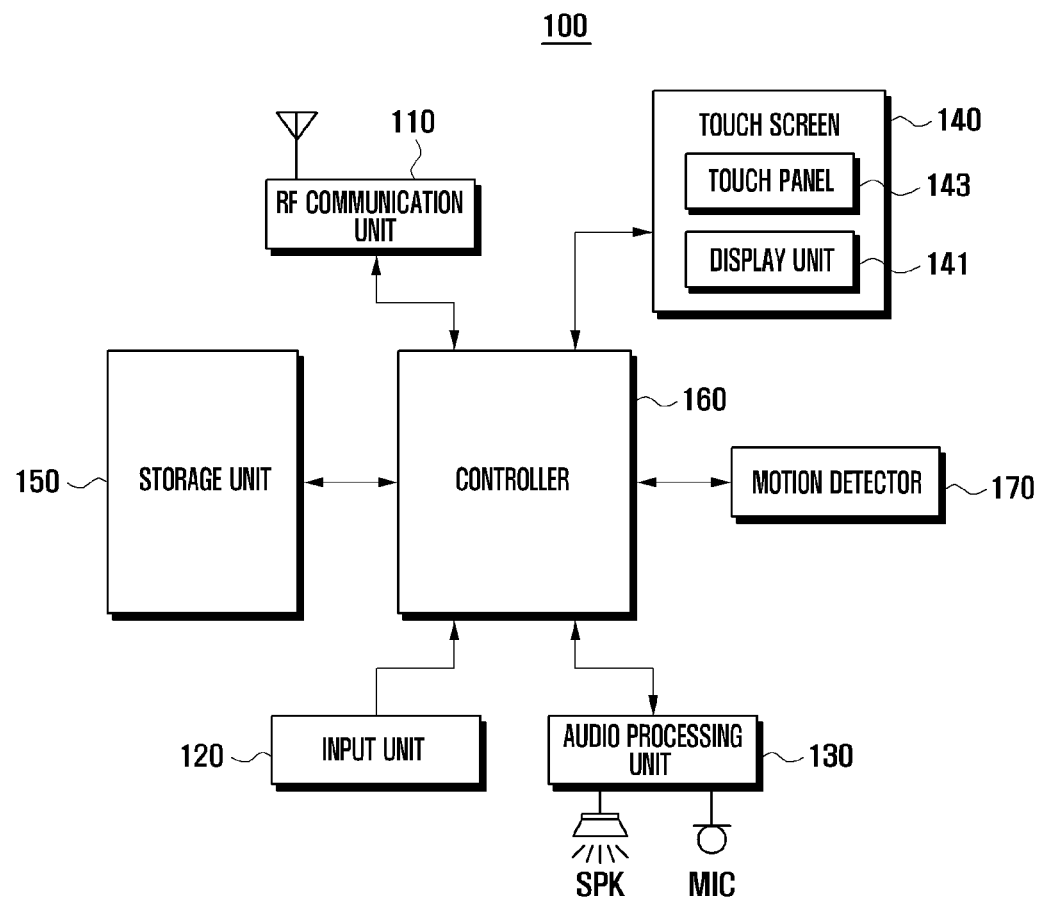
FIG. 1 is a schematic block diagram illustrating a mobile device according to an exemplary embodiment of the present invention.

FIG. 1 is a schematic block diagram illustrating a mobile device according to an exemplary embodiment of the present invention.

Referring to FIG. 1, the mobile device 100 includes a Radio Frequency (RF) communication unit 110, an input unit 120, an audio processing unit 130, a motion detector 170, a touch screen 140, a storage unit 150, and a controller 160.

The mobile device 100 is turned on and then initializes the elements described above. The mobile device 100 enables the motion detector 170 and touch screen 140 according to a user's settings. The mobile device 100 can display an idle screen, a menu screen, a widget screen, etc., on the display unit 141, according to preset schedule information. When a user operates the mobile device 100 so that the motion detector 170 creates a detected signal, the mobile device 100 can newly display an additional display region on the display unit 141. The additional display region may include a variety of menus and widgets, etc., so that it can allow the user to easily and rapidly execute a particular user function using the menus and widgets. The following description explains, in detail, the elements of the mobile device 100 and their functions or operations.

The RF communication unit 110 transmits and receives voice signals for a voice call and data for data communication, under the control of the controller 160. To do this, the RF communication unit 110 includes an RF transmitter (not shown) for up-converting the frequency of signals to be transmitted and amplifying the signals, and an RF receiver (not shown) for low-noise amplifying received RF signals and down-converting the frequency of the received RF signals. In an exemplary embodiment of the present invention, the RF communication unit 110 can be linked to a variety of menu items or widget items. For example, the RF communication unit 110 can be linked to a phone book item, a web access item, etc. The phone book item contains user information corresponding to a particular phone number. The web access item corresponds to a web access function. The web access item can be classified into a menu item or a widget item, based on access to a web server, data reception/transmission, etc. The phone book item and web access item are contained, as icons or images, in the additional display region. The phone book item and web access item can also be displayed on the display unit 141 according to the detected result of the motion detector 170. If the additional display region containing the phone book item and web access item is displayed on the display unit 141 and then a particular item is selected according to an input signal that is generated by the input unit 120 and/or the touch screen 140, the RF communication unit 110 can be enabled according to the selected item. The output process, features, and display state of the additional display region will be explained, in detail, later, referring to a view illustrating the user interface.

The input unit 120 includes a number of keys and function keys that allow a user to input numbers or letter information and to set a variety of functions. The function keys include direction keys, side keys, shortcut keys, etc., which are set to perform specific functions. In addition, the input unit 120 creates key signals for setting user's options and for controlling functions of the mobile device 100 and transmits them to the controller 160. The input unit 120 can be implemented with a QWERTY keypad, a 3×4 keypad, a 4×3 keypad, etc. In particular, if the touch screen 140 of the mobile device 100 is implemented as a full touch screen mode, the input unit 120 can include only side keys installed to sides of the external body of the mobile device 100. In that case, the input unit 120 is implemented with a key map displayed on the touch screen 140. The input unit 120 creates an input signal for designating a particular item displayed on the display area of the display unit 141, and an input signal for selecting a particular item contained in the additional display region, according to a user's operation, and then outputs them to the controller 160. The input unit 120 can also create input signals for setting output modes and outputs them to the controller 160. The output modes refer to modes where the additional display region is output or displayed on the display unit 141 in a direction, opposite to or identical to where the mobile device 100 is tilted, where the tilting is detected by the motion detector 170.

The audio processing unit 130 includes a speaker SPK and a microphone MIC. The speaker SPK reproduces audio data transmitted or received during the call, audio data contained in transmitted or received message, audio data stored in the storage unit 150, etc. The microphone MIC receives a user's voice or audio signals during the call. In an exemplary embodiment of the present invention, if the display area is altered on the display unit 141 by an additional display region according to signals detected by the motion detector 170, the audio processing unit 130 outputs sound effects corresponding to the alteration of the display area in the display unit 141.

The touch screen 140 sets images and coordinates corresponding to a number of input keys and function keys for allowing a user to input numbers and letter information and to set a variety of functions. When a touch event occurs on the touch screen 140, it is transferred from the touch screen 140 to the controller 160. The images corresponding to the function keys include direction keys, side keys, shortcut keys, etc. The touch screen 140 can create touch events related to a user's settings and the function controls of the mobile device 100 and outputs them to the controller 160. The touch screen 140 includes a display unit 141 and a touch panel 143.

The display unit 141 displays various types of screens according to the operations of the portable terminal 100. Examples of the screens are boot, idle, menu, widget, call, etc. The display unit 141 may be implemented with a Liquid Crystal Display (LCD), an Organic Light Emitting Diode (OLED), or the like. If the display unit 141 is implemented with an LCD or OLED, the display unit 141 may further include an LCD or OLED controlling unit, a memory for storing data, an LCD or OLED device, etc. In an exemplary embodiment of the present invention, the LCD or OLED is implemented with a touch screen mode. Therefore, the display unit 141 and the touch panel 143 can also provide the function of an input unit 120. In particular, the display unit 141 can output a display area and an additional display region.

The display area may be an area that outputs at least one menu item if the user has selected a menu screen. The display area may also be an idle screen area that outputs at least one widget item set by the user. In addition, the display area may be an area that displays a screen showing an activated user function.

The additional display region is an area that is virtually allocated and displayed, adjacent to the display area, i.e., a virtual display area. The additional display region display area is implemented by a software program. The additional display region is not displayed on the display unit 141 until a particular detected signal is created. That is, the additional display region is allocated to a certain size of area on the display unit 141 by the detected signal. The additional display region can display icons, according to a user's settings, that correspond to at least one menu item, at least one widget item, at least one file, etc. The additional display region can be located at a certain location on the display unit 141, according to the type of display unit. For example, if the display unit 141 is shaped as a rectangle, the additional display region can be virtually displayed on at least one of the areas that are adjacent to the top edge of the display unit 141, which is called a top additional display region, adjacent to the right or left edge of the display unit 141, which is called a right or left additional display region, and adjacent to the bottom edge of the display unit 141, which is called a bottom additional display region. The display area and the additional display regions will be explained in detail later, with reference to FIGS. 3 to 5.

The touch panel 143 creates a touch event and outputs it to the controller 160. The touch event contains location information about the user's touch region and information about types of touches, such as touch down or up, drag, etc. The touch panel 143 may be installed in the front of the mobile device 100. In that case, it is preferable that the touch panel 143 covers the entire front surface of the display unit 141. The touch panel 143 may be of different size than the display unit 141. In particular, the touch panel 143 can create a touch down event for selecting one of the items on the display area, a hold event for holding the selected item, a touch drag event for moving a particular event on the display unit 141, a touch up event for releasing the touch down state or a touch drag action, etc. After that, the touch panel 143 transfers the created events to the controller 160.

The motion detector 170 detects motions or movements of the mobile device 100 and may be implemented with at least one of the gravity detector, gyro detector, and acceleration detector. The motion detector 170 detects a tilting direction of the mobile device 100 and a detected signal corresponding to the tilted direction. The motion detector 170 can be initialized using electric power supplied when the mobile device 100 performs an initialization process. The motion detector 170 can also be initialized according to an input signal and/or a touch event. When an area alteration mode is activated, the motion detector 170 acquires a detected signal regarding a current state of the motion detector 170 and transfers it to the controller 160. For example, if the mobile device 100 changes its orientation from a horizontal state to a tilted state at a certain angle during the initialization, the motion detector 170 transfers its detected signal corresponding to the changed orientation to the controller 160.

After that, the motion detector 170 refers to the tilted state at a certain angle, under the control of the controller 160, as an initialization state, and then acquires detected signals according to the tilting motion of the mobile device 100 that occurs after the initialization process. After that, the motion detector 170 transfers the acquired detected signals to the controller 160. The motion detector 170 can create a detected signal when the user operates the mobile device 100. For example, if the mobile device 100 is tilted to the left at a certain angle with respect to the orientation set at the initialization, the motion detector 170 can create a left tilt detected signal. Likewise, the motion detector 170 can create right, top, and bottom tilt detected signals, respectively. Although the exemplary embodiment of the present invention explains that the motion detector 170 creates top, bottom, right and left tilt detected signals, it should be understood that the present invention is not limited to the exemplary embodiment. For example, the motion detector 170 can also create the detected signals tilted to respective corners of the mobile device 100, such as top right, top left, bottom right, and bottom left directions.

The storage unit 150 stores application programs required to operate the mobile device 100, for example, a User Interface (UI) application for operating the touch screen 140, a detector application for operating the motion detector 170. The storage unit 150 can also store user data. The storage unit 150 serves to buffer detected signals and signals according to touch events. The storage unit 150 is comprised of a program storage area and a data storage area.

The program storage area stores an Operating System (OS) for booting the mobile device 100. The program storage area also stores application programs for supporting a variety of user functions, for example, audio reproduction, still or moving image reproduction, file search, camera function, short-range wireless communication, etc. The mobile device 100 may further include a camera module, a short-range wireless communication module, etc. In an exemplary embodiment of the present invention, the program storage area can also store an application program for supporting an Area Alteration Mode (called an AAM supporting application) and an application for setting an Additional Display Region (called an ADR setting application).

The AAM supporting application can be loaded on the controller 160 according to an input signal of the input unit 120 and/or a touch event that occurred on the touch screen 140. The AAM supporting application can contain a routine for activating the motion detector 170 and detecting signals thereby; a routine for identifying types of detected signals; a display area managing routine for displaying an additional display region according to the type of detected signal on the display unit 141; and a function control routine for activating at least one of the menu, widget, file items contained in the additional display region. The function control routine calls and activates an application corresponding to a user's selected item from among the items contained in the additional display region. The routines are loaded on the controller 160 when the mobile device 100 is operated in an area alteration mode and create corresponding instructions for their functions, respectively.

The ADR setting application can be loaded on the controller 160 when the user selects a menu item or generates an input signal or a touch event. The ADR setting application contains a routine for adjusting the size of the additional display region and a routine for adding, removing, and altering items in the additional display region, according to input signals.

The data storage area stores data when the mobile device 100 is operated. The data refers to user data and information about the user data. Examples of the user data are phone book information, photographs, images, contents, etc. The data storage area also stores information about at least one item to be displayed on the display area, information about the range of additional display region, and information about at least one item to be displayed on the additional display region.

The controller 160 controls the supply of electric power, the activation of elements included in the mobile device 100, and the flow of signals among the elements. In particular, the controller 160 can control the operations related to the area alteration mode. The controller 160 is explained in more detail below with reference to FIG. 2.

Figure 2:
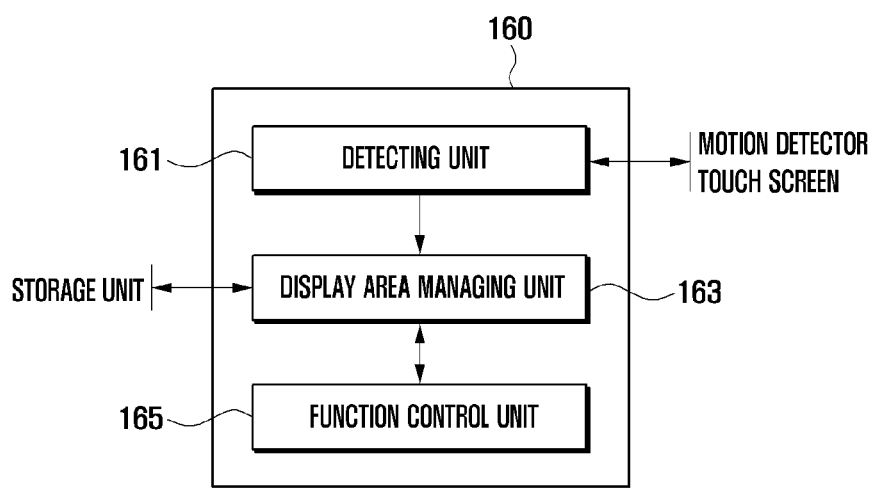
FIG. 2 is a detailed view illustrating a controller of a mobile device according to an exemplary embodiment of the present invention.

FIG. 2 is a detailed view illustrating the controller of the mobile device shown in FIG. 1 according to an exemplary embodiment of the present invention.

Referring to FIG. 2, the controller 160 includes a detecting unit 161, a display area managing unit 163, and a function control unit 165.

The detecting unit 161 acquires a detected signal of the motion detector 170 and/or a signal corresponding to a touch event that occurred on the touch screen 140. The detecting unit 161 identifies a type of detected signal and then transfers the detected signal to the display area managing unit 163. When the mobile device 100 is operated in an area alteration mode, the detecting unit 161 acquires the detected signal from the motion detector 170 and uses it as the reference for the initial state of the motion detector 170. If the detecting unit 161 receives the detected signals, created when the mobile device 100 is operated, from the motion detector 170, it identifies the type of the detected signal. That is, the detecting unit 161 determines whether the detected signal corresponds to a left, right, top, bottom, or diagonal direction tilted detected signal. After that, the detecting unit 161 transfers information corresponding to the identified type of detected signal to the display area managing unit 163.

The detecting unit 161 can also identify a touch event that occurred on the touch screen 140 and transfer it to the display area managing unit 163. That is, the detecting unit 161 can transfer information about a location where the touch event occurs and information about the type of touch event to the display area managing unit 163. For example, if the user touches a particular area on the touch screen 140 and then retains the touch for a period of time, the detecting unit 161 can transfer the location information about the user's touch and a hold event according to the user's retained touch to the display area managing unit 163. Likewise, the detecting unit 161 can also transfer a variety of touch events, such as a drag, flick, tap, etc., and location information about the touch events, to the display area managing unit 163.

The display area managing unit 163 manages the display area and the additional display region on the display unit 141, based on the detected signal and the touch event output from the detecting unit 161. When an idle screen is displayed, the display area managing unit 163 displays components, included in the idle screen, on the display area. Examples of the components are a menu item, a widget item, or a file item, set by the user. The display area managing unit 163 receives an input signal or a touch event, indicating a particular item displayed on the display area, from the detecting unit 161, and then transfers it to the function control unit 165. If the function control unit 165 activates a user function, the display area managing unit 163 configures a screen to be displayed on the display unit 141 according to the activation of the user function. For example, the function control unit 165 activates a message writing function according to a user's input, and the display area managing unit 163 displays a window for allowing a user to write a message on the display area of the display unit 141. The display area managing unit 163 can also display or remove an additional display region on the display unit 141 according to detected signals from the detecting unit 161. For example, if the mobile device 100 displaying an idle screen is tilted to the left, the display area managing unit 163 can receive a left-tilted detected signal from the detecting unit 161. In that case, the display area managing unit 163 can display an additional display region of a certain area on the display unit 141, in a certain mode, from the right edge to the left. The additional display region can be displayed in such a way that it is pushing part of the display area on the display unit 141 or overlaying the display area. Alternatively, the additional display region can be displayed on the right area of the display unit 141 in a slide mode. The additional display region can also be displayed in a certain area of the right area in a fade-in mode where it gradually becomes brighter from a dim state. Meanwhile, when the additional display region is displayed on the display unit 141, pushing the display area, part of the left area of the display area is removed from the display unit 141. That is, the display area managing unit 163 removes part of the display area from the display unit 141, corresponding to the size of the additional display region newly appearing on the display unit 141. After the additional display region has been displayed and then a certain period of time has elapsed, the display area managing unit 163 automatically removes the displayed additional display region and restores the original display area on the display unit 141. That is, the display area managing unit 163 can remove the additional display region from the display unit 141 according to a preset condition. The preset condition may, for example, be a drag touch event corresponding to a drag gesture that touches and drags the additional display region toward outside of the display unit 141, a key input signal for removing the additional display region, and a motion for tilting the mobile device 100 in a certain direction.

When the display area managing unit 163 displays the additional display region on the display unit 141, it detects a preset mode and determines the direction for displaying the additional display region according to the mode. The mobile device 100 has options for setting first and second modes according to the signals corresponding to the tilted directions of the mobile device 100, detected by the motion detector 170. The first mode is to display the additional display region on the area opposite to the tilted direction of the mobile device 100. The second mode is to display the additional display region on the area in the same direction as the tilted direction of the mobile device 100. That is, the display area managing unit 163 can detect the currently set mode. If the currently set mode is the first mode, the display area managing unit 163 receives a tilt detected signal from the motion detector 170 and then displays the additional display region on part of the display unit 141, opposite the tilted direction of the mobile device 100. Likewise, if the currently set mode is the second mode, the display area managing unit 163 receives a tilt detected signal from the motion detector 170 and then displays the additional display region on part of the display unit 141, in the same direction as the tilted direction of the mobile device 100. The display area managing unit 163 can also provide a menu item for setting the first and second modes according to a user's request.

The function control unit 165 activates a user function corresponding to an activated item, if a user selects at least one of the items in the display area and additional display region, such as menus, widgets, files, etc., and requests the activation of the selected item. The function control unit 165 can perform a function corresponding to an item displayed on the display area, for example, an audio file, based on a menu item contained in the additional display region. To do this, the user can generate a touch event or an input signal for selecting one of the items in the display area, for example, an audio file, via the touch screen 140 or the input unit 120, so that the motion detector 170 creates a detected signal. The display area managing unit 163 receives the detected signal from the detecting unit 161 and then displays the additional display region containing the audio file item on the display unit 141. In that case, the user can generate a touch event so that the selected audio file is superimposed on a menu item in the additional display region, for example, a music player, or can create an input signal for activating a music player via the input unit 120. When an interaction, such as a touch event or an input signal, is created, the function control unit 165 executes the selected audio file item based on the music player. If the music player reproduces the selected audio file, the function control unit 165 automatically releases the area alteration mode where the additional display region is displayed on the display unit 141 according to the detected signal. If a preset input signal or touch event is created via the input unit 120 or the touch screen 140, the function control unit 165 can release the area alteration mode.

As described above, the mobile device 100 can provide an additional display region as well as a display area on the display unit 141, and can display the additional display region on the display area according to a user's operation, thereby allowing the user to easily perform the searching and activating processes with respect to a number of items. The relationship between the display area and the additional display region is described in more detail below, with reference to FIG. 3.

Figure 3:
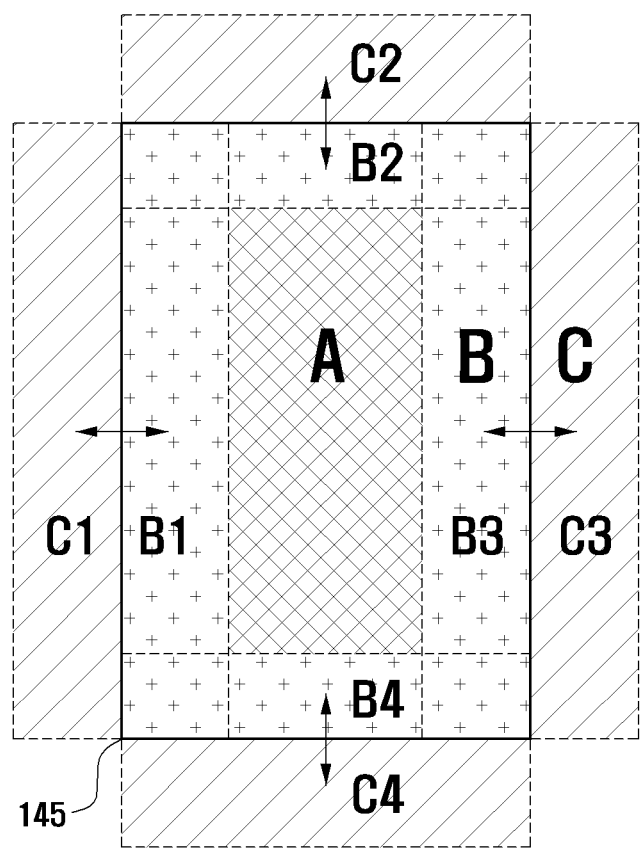
FIG. 3 is a view describing a display area of a display unit according to an exemplary embodiment of the present invention.

FIG. 3 is a view that describes a display area of the display unit 141 according to an exemplary embodiment of the present invention.

Referring to FIG. 3, the display unit 141 can display a screen area that is divided into a display area 145 and an additional display region C. The display area 145 refers to an actually displayed screen that is physically configured in the display unit 141. The additional display region C refers to a virtual display screen that is virtually displayed according to a detected signal. The display area 145 is comprised of a continuous display area A and a variable display area B. The continuous display area A refers to an area set to be continually displayed on the display unit 141 although a detected signal is created. The variable display area B refers to an area where its location is switched with the additional display region C when a detected signal is created.

Although the additional display region C is switched, in position, with the variable display area B according to a detected signal, the continuous display area A is continually displayed on the display unit 141. If the additional display region C is displayed on the display area 145 according to a detected signal, the variable display area B is be removed from the display area 145. Therefore, the additional display region C can be set so that its size is the same as the variable display area B. Since the generation of a detected signal can remove only the variable display area B from the display area 145, the continuous display area A can be continually displayed although its location is altered by the detected signal. As shown in FIG. 3, the continuous display area A can be located at the center of the display unit 141, surrounded by the variable display area B. If the additional display region C is displayed on the display unit 141, overlaying part of the display area 145, the continuous display area A and the variable display area B may be fixed on the display unit 141.

The variable display area B is located at the periphery zone around the continuous display area A. Therefore, the variable display area B is comprised of left, right, top, and bottom variable display areas B1, B3, B2, and B4. The left, right, top, and bottom variable display areas B1, B3, B2, and B4 may be shared with each other, with respect to a certain area at each of the corners of the display unit 141, which is called a corner area. The corner area may be removed from the display unit 141 by at least one of two detected signals. For example, the top right corner area of the variable display area B can be removed from the display area 145 if a detected signal is created to display a bottom additional display region C4 or a right additional display region C1 on the display area 145. Meanwhile, if the additional display region C is displayed on the display unit 141, overlaying part of the display area 145, according to a detected signal, the variable display area B may be superimposed with the additional display region C. For example, if the left additional display region C1 is displayed on the display unit 141, it is located above the left variable display area B1, so that the left variable display area B1 is not displayed.

The additional display region C refers to a virtual display area adjacent to the variable display area B. That is, the additional display region C is comprised of left, right, top, and bottom additional display regions C1, C3, C2 and C4. The left, right, top, and bottom additional display regions C1, C3, C2 and C4 are located at the left, right, top, and bottom sides of the left, right, top, and bottom variable display areas B1, B3, B2, and B4, respectively. The size of the additional display region C can vary according to a user's settings or the number/size of the items. The menu, widget or file items, contained in the additional display region C, can be altered, according to a user's settings, using an application for setting the additional display region.

As described above, because the screen area to be displayed on the display unit 141 is comprised of the continuous display area A, the variable display area B, and the additional display region C, the mobile device 100 can acquire an effect that expands the display area 145.

Figure 4:
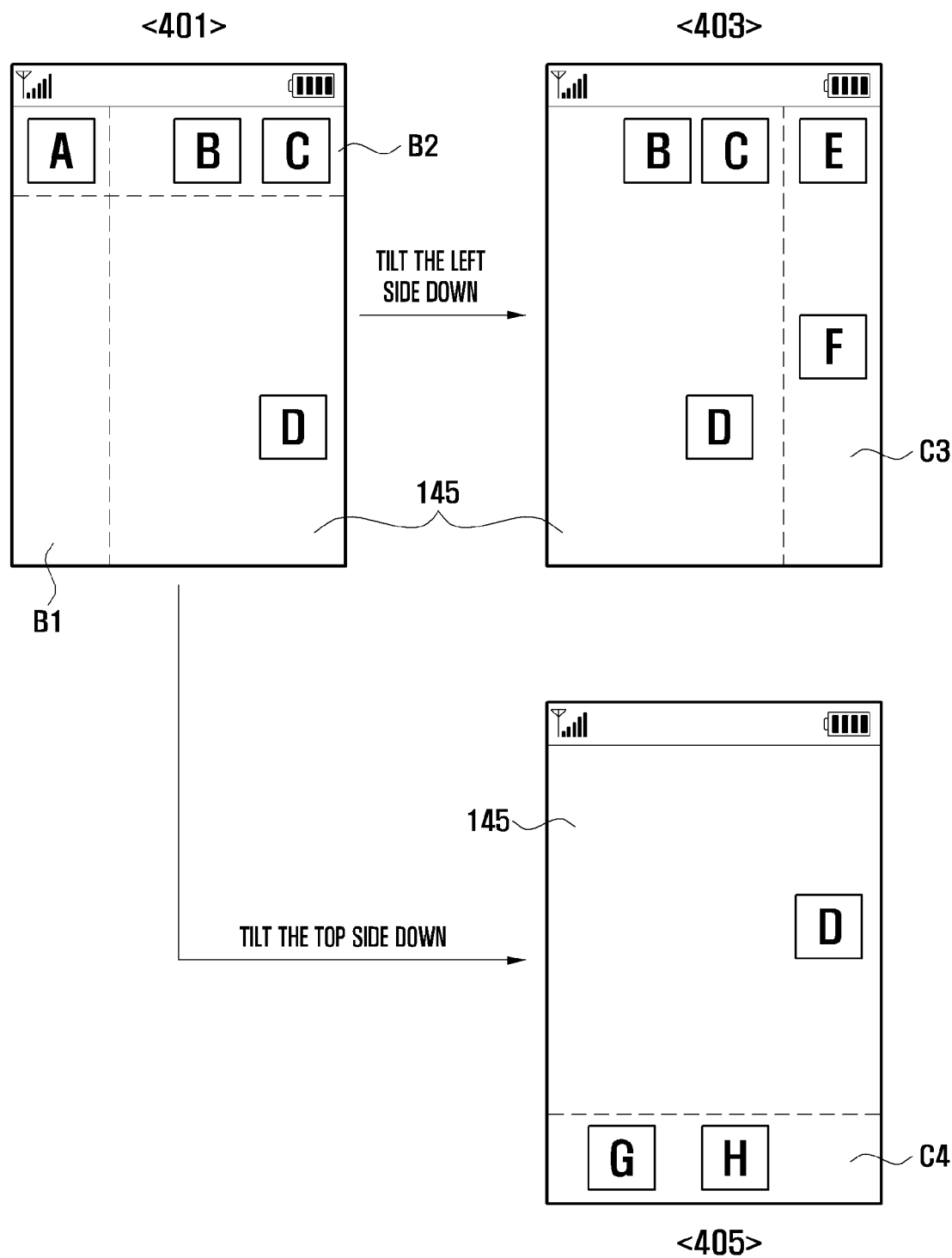
FIG. 4 is a view describing a user interface according to an exemplary embodiment of the present invention.

FIG. 4 is a view that describes a user interface for operating a display area of the mobile device 100, according to an exemplary embodiment of the present invention.

Referring to FIG. 4, if the user turns on the mobile device 100, the controller 160 initializes the mobile device 100 and displays a default idle screen on the display unit 141. As shown in diagram 401 of FIG. 4, the display unit 141 displays an idle screen containing four items, A, B, C, and D. Each of the four items may be at least one of the menu, widget, file items, etc. The items on the display unit 141 may be altered according to a user's setting and their number may also be adjusted.

If the mobile device 100 is tilted in such a way that its left side, for example, is down as in a state shown in diagram 401 of FIG. 4, the motion detector 170 creates a detected signal corresponding to the left tilting and transfers it to the controller 160. As shown in diagram 403 of FIG. 4, the controller 160 moves the display area 145 to the left on the display unit 141 and then displays it thereon. In that case, the controller 160 removes the left variable display area B1 containing, for example, an item A from the display unit 141. Simultaneously, the controller 160 displays the right additional display region C3 containing, for example, two items E and F on the display area 145. As a result of tilting down the left side of the mobile device 100, the controller 160 can display five items, B, C, D, E, and F.

If the mobile device 100 is tilted in such a way that its top side, for example, is down as in a state shown in diagram 405 of FIG. 4, the motion detector 170 creates a detected signal corresponding to the top tilting and transfers it to the controller 160. As shown in diagram 405 of FIG. 4, the controller 160 moves the display area 145 to the top on the display unit 141 and then displays it thereon. In that case, the controller 160 removes the top variable display area B2 containing three items A, B, and C from the display unit 141. Simultaneously, the controller 160 displays the bottom additional display region C4 containing two items G and H on the display area 145. As a result of tilting down the top side of the mobile device 100, the controller 160 can display three items, G, H, and D.

As described above, the mobile device 100 can allocate items, not currently displayed on the display area 145, to the additional display region C, and can then display them on the display unit 141 according to a detected signal, so that it can achieve an effect to expand the screen area of the display unit 141.

Figure 5:
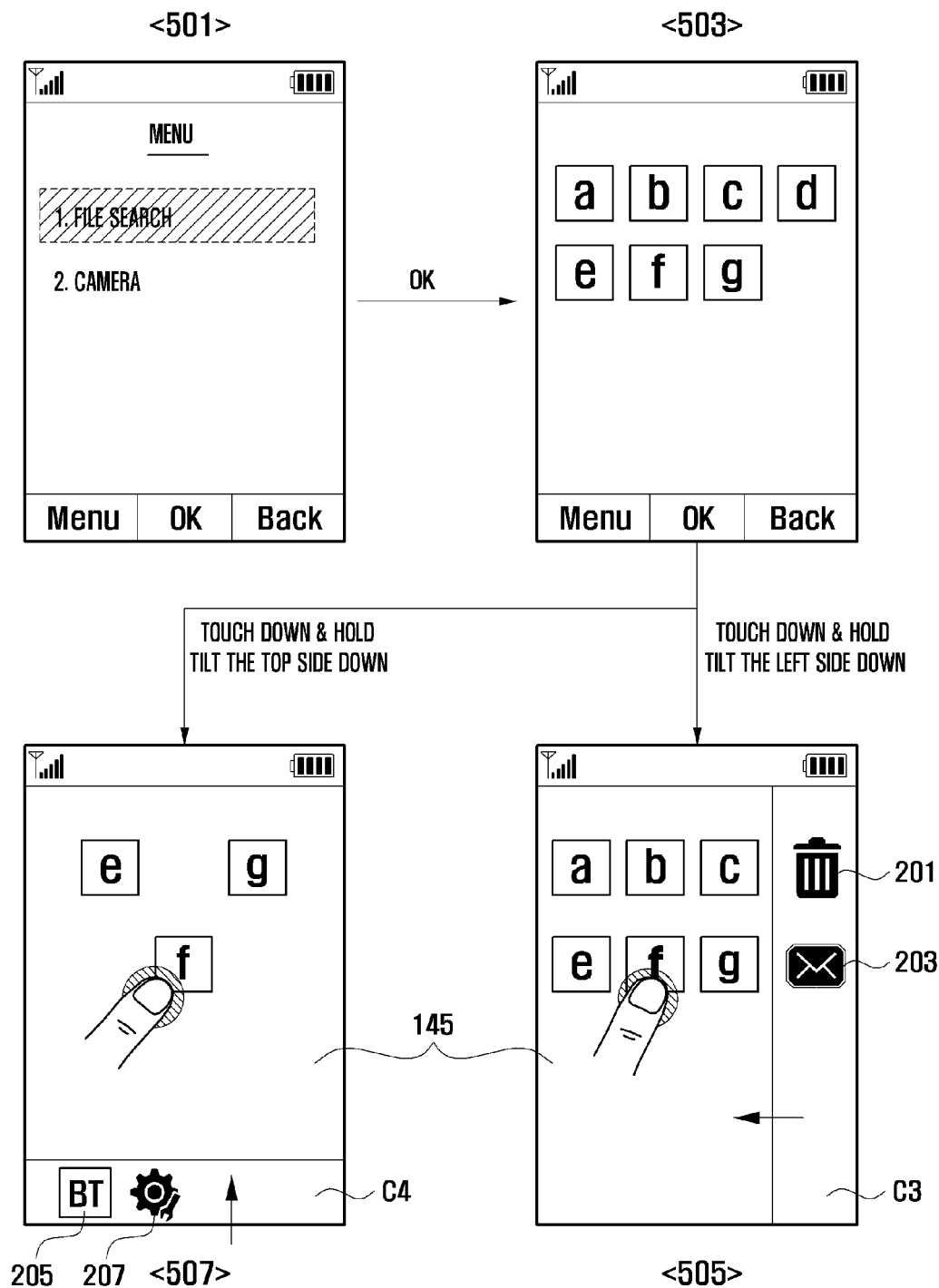
FIG. 5 is a view describing a user interface according to an exemplary embodiment of the present invention.

FIG. 5 is a view that describes a user interface for operating a display area of the mobile device 100, according to an exemplary embodiment of the present invention.

Referring to FIG. 5, when the user turns on the mobile device 100, the controller 160 initializes the mobile device 100 and displays a default idle screen on the display unit 141. If the user selects an item for executing a menu, the controller 160 controls the display unit 141 to display the menu screen as shown in diagram 501 of FIG. 5. The menu screen shows items, for example, "File Search," "Camera Function," etc. If the user creates an input signal or a touch event in order to select an item, for example, "File Search," the display unit 141 can provide an effect indicating that the item has been selected. After that, the user can further create an input signal and a touch event, via the key "OK," in order to view the sub-items of the selected item.

The controller 160 controls the display unit 141 to display the sub-items of the item "File Search," for example, a, b, c, d, e, f, and g, on the display area as shown in diagram 503 of FIG. 5. The sub-items, a, b, c, d, e, f, and g, may be an audio file, a video file, a text file, etc. The sub-items, a, b, c, d, e, f, and g, may also be related to user function items.

When a certain number of items are displayed on the display area 145 of the display unit 141 as shown in diagram 503 of FIG. 5, the user can create a variety of input signals. For example, the user can create a touch down event for an item 'f' based on the touch screen 140. The user can also create a hold event for retaining the touch down state. The user can apply a tilting motion to the mobile device 100, for example, tilting the left side down, while creating the hold event. If the user selects the item 'f' by creating a touch down and hold event, and then tilts the mobile device 100 so that the motion detector 170 can create a left-tilted detected signal, the controller 160 can display an additional display region C on the display unit 141 as shown in diagram 505 of FIG. 5.

As shown in the example of diagram 505 of FIG. 5, the controller 160 can overlay the right additional display region C3 on the right side of the display area 145, while retaining the display area 145 on the screen as shown in diagram 503 of FIG. 5. In that case, the display unit 141 displays the items, a, b, c, e, f, g, on the display area 145 and simultaneously icons, such as a recycle bin icon 201 and a message icon 203, on the right additional display region C3. The right additional display region C3 can display a variety of icons other than the recycle bin icon 201 and message icon 203 according to a user's settings. The user can set the number of items to be displayed on the right additional display region C3. Meanwhile, when the right additional display region C3 is displayed on the screen as shown in diagram 505 of FIG. 5 while the user is applying the hold event to the item 'f', the user can also use the user functions, by cooperating with the items displayed on the right additional display region C3. For example, the user can drag and superimpose the item 'f' to and on the recycle bin icon 201 or message icon 203. The controller 160 can detect a touch event occurred on the item 'f' and its location information in such a way that the item 'f' is located at a particular location, for example, the recycle bin icon 201 and then a present touch event, for example, a touch up event, determines the location. When the input signals corresponding to a series of operations as described above are created, the controller 160 processes the item 'f' according to the user function of the recycle bin icon 201, i.e., deletes the item 'f'. Alternatively, if the user moves the item 'f' onto the message icon 203 and then creates a preset input signal, the controller 160 activates a message writing function containing the item 'f'.

When a certain number of items are displayed on the display area 145 as shown in diagram 503, the user can create a touch down and hold event on a particular item, for example, 'f'. After that, the user tilts the top side of the mobile device 100 down. In that case, as shown in diagram 507, the controller 160 can fix the selected item 'f' at a particular location on the display unit 141 and then move the display area 145. That is, the controller 160 fixes the location of the selected item 'f' on the display unit 141 and simultaneously moves the display area 145 to the top of the display unit 141. According to the movement of the display area 145, the controller 160 displays the bottom additional display region C4 on the display unit 141. In an exemplary embodiment of the present invention, it is assumed that the bottom additional display region C4 has a BT icon 205 for executing short-range communication, and an edit icon 207 for executing file edit function. After performing the touch down and hold event and the top tilting operation, the display unit 141 displays the items, e, f and g, on the display area 145, and also the BT icon 205 and edit icon 207 on the bottom additional display region C4.

Although the exemplary embodiment has been explained in such a way that the user creates a touch down and hold event to select a particular item, it should be understood that the present invention is not limited to the exemplary embodiment. For example, the user can also select an item by creating an input signal using the input unit 120.

As described above, although the display area 145 is moved and the additional display region C is displayed on the display unit 141, according to the detected signal, the display operating system, according to the present invention, can fix a particular item, selected by an input signal of the input unit 120 and/or a touch event of the touch screen 140, in a location on the display unit 141. Therefore, the system can allow the user to select a particular item using an input signal or a touch event and to use a particular menu on the additional display region C by operating the mobile device 100 to create detected signals.

Although the exemplary embodiments shown in FIGS. 4 and 5 have been explained in such a way that an additional display region appears on a certain area of the display unit 141, opposite to the tilted direction of the mobile device 100, it should be understood that the present invention is not limited to the exemplary embodiment. For example, the exemplary embodiments may be modified in such a way that an additional display region appears on a certain area of the display unit 141, in the same as the tilted direction of the mobile device 100. For example, if the user tilts the left side of the mobile device 100 down, the left additional display region C1 may appear on a certain area of the display unit 141. Likewise, if the user tilts the right side of the mobile device 100 down, the right additional display region C3 may appear on a certain area of the display unit 141. In addition, if the user tilts the top or bottom side of the mobile device 100 down at a certain angle, the top or bottom additional display region C2 or C4 may appear on a certain area of the display unit 141. As described above, the controller 160 can display an additional display region C to be displayed to the tilted direction by overlying it on the top of the display area 145 or by pushing the display area 145.

The mobile device 100 can support an option so that the user can set the direction to display the additional display region according to the tilted direction. That is, the mobile device 100 can allow the user to set a mode so that the additional display region C is displayed on a certain area of the display unit 141, in the same as the tilted direction or in the opposite to the tilted direction, according to an input signal. To do this, the mobile device 100 can provide a menu item for setting the display direction of the additional display region C according to the tilted direction. In that case, the user can set the menu so that the additional display region C is displayed on a certain are of the display unit 141 in the user's desired direction. For example, if the user sets the menu so that the additional display region C is displayed on a certain area of the display unit 141 in the same as the tilted direction of the mobile device 100, the mobile device 100 displays it on the area in the tilted direction, where the tilted direction is determined according to the detected signal acquired by the motion detector 170. In contrast, if the user sets the menu so that the additional display region C is displayed on a certain area of the display unit 141 in the opposite direction to the tilted direction of the mobile device 100, the mobile device 100 displays it on the area in the opposite to the tilted direction, where the tilted direction is determined according to the detected signal acquired by the motion detector 170. In addition, the mobile device 100 can also support an option so that the display direction of the additional display region C can be set by operating a particular key of the input unit 120. To do this, a particular key can be set to have a function for controlling the display direction of the additional display region C according to a user's settings or a mobile device manufacturer's design mode. In that case, the user can alter the display direction of the additional display region C by operating the particular key. The particular key can be set so that the additional display region C is displayed in the same as the tilted direction of the mobile device 100 or in the opposite direction. The particular key may be implemented, for example, with a toggling mode.

The foregoing description has explained the configurations and operations of the display operating system and the user interfaces for the system. In the following description, a display operating method of the mobile device 100 is described in detail with reference to FIG. 6.

Figure 6:
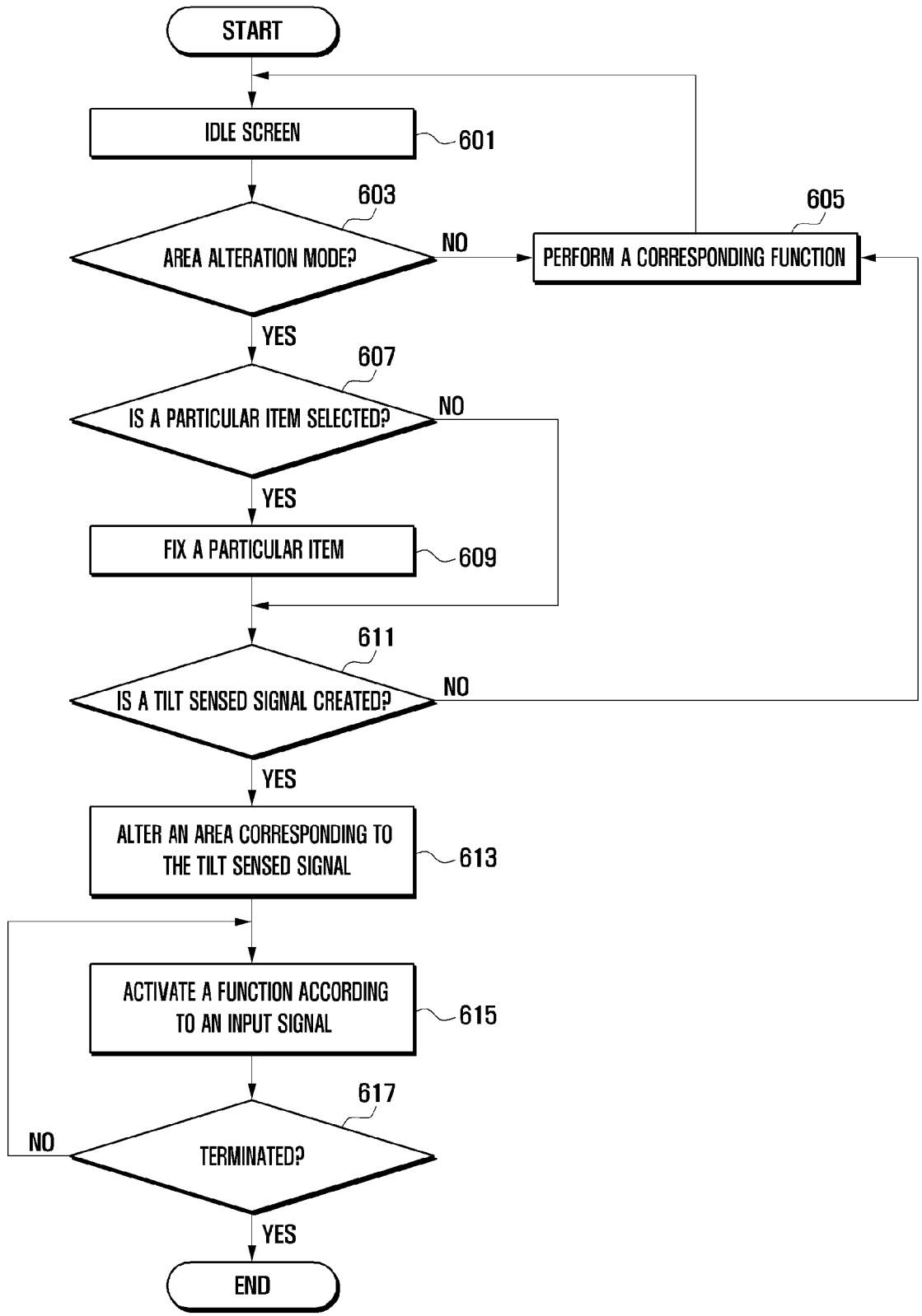
FIG. 6 is flowchart describing a method of operating a display unit of a mobile device according to an exemplary embodiment of the present invention.

FIG. 6 is flowchart that describes a method of operating a display unit 141 of a mobile device according to an exemplary embodiment of the present invention.

Referring to FIGS. 1 to 6, when the mobile device 100 is turned on, the controller 160 initializes the elements in the mobile device 100 and displays a default idle screen on the display unit 141 according to a preset schedule at step 601. The controller 160 can display one or more items, for example, menu, widget and file items, on the idle screen, according to preset information. The controller 160 can also display the items on the display unit 141 according to a user's settings or a user's request.

The controller 160 determines whether an input signal for executing an area alteration mode is created at step 603. If the controller 160 determines at step 603 that an input signal does not correspond to the input signal for executing an area alteration mode, it performs a corresponding function at step 605. Examples of the corresponding function are call connecting, file searching, camera function, message writing, web accessing, etc. After performing a corresponding function at step 605, the controller 160 returns to and proceeds with step 601.

In contrast, if the controller 160 determines at step 603 that an input signal for executing an area alteration mode is created, it activates an area alteration mode. That is, the controller 160 activates the motion detector 170 in order to support the area alteration mode. The controller 160 prepares an additional display region C to be displayed on the display unit 141 according to a detected signal. The additional display region C refers to a virtual display area that is not displayed on the display unit 141.

The controller 160 determines whether an input or a touch event for selecting one of the items on the display unit 141 is created at step 607. If an input or a touch event is created at step 607, the controller 160 fixes the selected item on the display unit 141 at step 609. For example, if the user has selected a message item on the display unit 141, the controller 160 fixes an icon corresponding to the selected message item on the display unit 141.

After that, the controller 160 determines whether a tilt detected signal is created at step 611. That is, if the user tilts the mobile device 100 in a certain direction, the controller 160 can detect the tilted direction of the mobile device 100 based on the tilt detected signal output from the motion detector 170. For example, the controller 160 can detect left, right, top, bottom, and diagonal direction tilt detected signals, based on the detected signal output from the motion detector 170, according to the tilted direction of the mobile device 100. If the controller 160 determines at step 611 that a tilt detected signal has not been created, it performs a user function corresponding to an input signal at step 605.

In contrast, if the controller 160 determines at step 611 that a tilt detected signal has been created, it alters an area on the screen of the display unit 141, corresponding to the tilt detected signal, at step 613. For example, if the controller 160 detects a left-tilted detected signal, it moves the display area 145, currently displayed on the display unit 141, to the left side of the display unit 141, and simultaneously displays the right additional display region C3 on the display unit 141, by the size of the display area 145, moved to the left side. Likewise, if the controller 160 detects a bottom-tilted detected signal, it moves the display area 145, currently displayed on the display unit 141, to the bottom side of the display unit 141, and simultaneously displays the top additional display region C2 on the display unit 141, by the size of the display area 145, moved to the bottom side. Meanwhile, the controller 160 can overlay and display an additional display region C on the display area 145 displayed on the display unit 141 when the mobile device 100 is tilted, without moving the display area 145. For example, if the controller 160 detects a right-tilted detected signal, it overlays and displays a left additional display region C1 on the left side of the display area 145. While the controller 160 is displaying an additional display region C, it can simultaneously display preset items on the additional display region C. The preset items may be at least one of menu, widget, and file items. When the controller moves the display area 145 on the display unit 141, the items in the display area 145 are also moved. The controller 160 may not move the item that is fixed on the display unit 141 at step 609.

After that, the controller 160 controls the activation of a function according to an input signal at step 615. If the user selects and activates an item on the display area or additional display region C by the input unit 120 and/or the touch screen 140, the controller 160 can activate a user function corresponding to the selected item. In particular, the controller 160 can execute a corresponding use function, by associating the item, selected at step 609, with the item selected at step 615. For example, in an exemplary embodiment of the present invention, it is assumed that, if the user has selected a message item at step 607 and then operates the mobile device 100 so that an additional display region C containing a recycle bin function can be displayed on the display area 135 at step 611, the mobile device 100 creates a corresponding detected signal. If the user creates an input signal or a touch event in order to use an item corresponding to the recycle bin function, the controller 160 can delete the message item. That is, if the controller 160 activates a particular item on the additional display region C, it can activate a user function corresponding to the particular item, based on the selected item.

After activating a corresponding function at step 615, the controller 160 determines at step 617 whether the activated function is terminated. If the controller 160 determines at step 617 that the activated function is not terminated, it returns to and proceeds with step 615.

When an additional display region C is displayed on the display unit 141, the user can operate the mobile device 100 in order to create a detected signal corresponding to a direction, opposite to the area displaying the additional display region C. In that case, the controller 160 removes the additional display region C from the display unit 141 and then displays the original display area 145. If the additional display region C has been displayed and then a preset period of time has elapsed, the controller 160 automatically displays the original display area 145. The controller 160 can remove the additional display region C from the display unit 141 according to a preset condition. The preset condition may be, for example, a touch event where the additional display region C is touched and then dragged outside the display unit 141, a key input signal, or the like.

As described above, the display operating method of the mobile device can display an additional display region C on the display unit 141, and expand the display area 145, according to a user's control, thereby allowing the user to select and activate a variety of menus or files.

Although the drawings do not illustrate this, the mobile device may be configured to selectively further include units having add-on functions, such as, for example, a short-range communication module for short-range wireless communication, a camera module for capturing still images or moving images, an interface for wireless or wired transmitting/receiving of data, an Internet communication module for performing communication via the Internet, and a digital broadcast module for receiving and reproducing broadcast. With the spread of digital convergence, although mobile devices are too various to list their modifications in this description, it will be easily appreciated by those skilled in the art that other units equivalent to the above-listed units may be further included in the mobile device according to the present invention. Also, it will be appreciated by those skilled in the art that, according to the purposes, the mobile device may be implemented by omitting a particular element or replacing it with other elements.

The mobile device according to the present invention includes all types of devices with a motion detector. It will be appreciated by those skilled in the art that the mobile device can be applied to all information communication devices supporting various types of communication protocols, multimedia devices, and their applications, such as, mobile communication terminals, Portable Multimedia Players (PMPs), digital broadcast players, Personal Digital Assistants (PDAs), audio players (e.g., MP3 player), mobile game devices, smart phones, laptop computers, hand held computers, etc.

As described above, the method and apparatus for operating the display unit, according to the present invention, allow the user to easily and rapidly operate user functions in the mobile device.

The method and apparatus also allow the user to easily and rapidly operate a user function in the mobile device, using menus and widgets on the additional display region.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for operating a display unit of a mobile device, the method comprising:
    displaying a display area on a display unit;
    detecting an input signal while the display area is being displayed, the input signal corresponding to a motion of the mobile device, wherein the detecting of the input signal comprises detecting that the motion of the mobile device comprises a tilt of the mobile device in a certain direction and acquiring a tilt detected signal corresponding to the tilted direction; and
    when the input signal is detected, moving an additional display region from not on the display unit onto a location on the display unit determined according to the input signal while removing a part of the display area from the display unit and continuing to display a remaining part of the display area on the display unit,
    wherein the additional display region and the removed part of the display area are determined according to the motion of the mobile device,
    wherein the additional display region comprises one of at least one additional display region each corresponding to a motion of the mobile device, and
    wherein the additional display region is configured to display menus, widgets, and files.

2. The method of claim 1, wherein the displaying of the additional display region comprises:
    displaying the additional display region on a certain area of the display unit, adjacent to an area that is opposite to the tilted direction or in a same direction as the tilted direction.

3. The method of claim 2, wherein the displaying of the additional display region comprises:
    overlaying and displaying the additional display region on the display area.

4. The method of claim 2, wherein the additional display region displaces the display area by moving the display area in a certain direction by a size corresponding to a certain region of the additional display region which is being displayed on the display unit.

5. The method of claim 2, further comprising:
    receiving a particular input signal via an input unit; and
    setting, according to the particular input signal, a mode selected from a mode so that the additional display region is displayed on a certain area of the display area, opposite to the tilted direction, and a mode so that the additional display region is displayed on a certain area of the display area, in the same as the tilted direction.

6. The method of claim 1, further comprising:
    displaying at least one item on the display area and the additional display region.

7. The method of claim 6, further comprising:
    selecting a particular item on the display area or the additional display region, according to a preset input signal or touch event; and
    fixing a location of the selected item on the display unit.

8. The method of claim 7, further comprising:
    activating a user function corresponding to a particular item displayed on the additional display region, according to the selected item.

9. The method of claim 1, further comprising:
    removing the additional display region from the display unit according to a preset condition.

10. An apparatus for operating a display unit of a mobile device, the apparatus comprising:
    a motion detector for creating a detected signal according to a tilting motion of a display unit of the mobile device;
    the display unit for displaying a display area and for selectively displaying an additional display region from not on the display unit onto a location on the display unit determined according to a preset detected signal output from the motion detector; and
    a controller for controlling the display unit to move or remove the additional display region respectively onto or from the display unit, according to the detected signal and for controlling removing a part of the display area from the display unit when the additional display region is moved onto the display unit and continuing to display a remaining part of the display area on the display unit, wherein the creating of the detected signal comprises detecting that the motion of the mobile device comprises the tilting in a certain direction and acquiring a tilt detected signal corresponding to the tilted direction, wherein the additional display region and the removed part of the display area are determined according to the tilting motion, wherein the additional display region comprises one of at least one additional display region each corresponding to a motion of the mobile device, and wherein the additional display region is configured to display menus, widgets, and files.

11. The apparatus of claim 10, further comprising:
a storage unit for storing preset items that are displayed on the display area and on the additional display region.

12. The apparatus of claim 11, further comprising at least one of
a touch panel for creating a touch event to select, move, or activate one of the items on the display area and the additional display region, and
an input unit for creating an input signal to select, move, or activate one of the items on the display area and on the additional display region.

13. The apparatus of claim 12, wherein, if a particular item is selected on the display area or on the additional display region, the controller fixes a location of the selected item on the display unit.

14. The apparatus of claim 10, wherein the controller comprises:
a detecting unit for receiving a detected signal output from the motion detector;
a display area managing unit for displaying the additional display region on the display unit according to the detected signal; and
a function control unit for activating, if an item on the display area and the additional display region is selected according to a user's input, a user function corresponding to the selected item.

15. The apparatus of claim 14, wherein the display area managing unit controls areas of the display unit, on which the additional display region is displayed, according to a direction of the detected signal.

16. The apparatus of claim 15, wherein the display area managing unit removes the additional display region from the display unit and restores the display area on the display unit, according to a preset condition.

17. The apparatus of claim 14, wherein the display area managing unit performs a control operation so that the additional display region is displayed on a certain area of the display area, in a same direction as a direction of the detected signal or a direction opposite to the direction of the detected signal.

18. The apparatus of claim 17, wherein the additional display region is overlaid and displayed on the display area, or wherein the additional display region displaces the display area by moving the display area in a certain direction by a size corresponding to a certain region of the additional display region which is being displayed on the display unit.

19. The apparatus of claim 14, further comprising:
an input unit for creating an input signal to set a mode selected from a mode so that the additional display region is displayed on a certain area of the display area, opposite to the tilted direction, and a mode so that the additional display region is displayed on a certain area of the display area, in a same direction as the tilted direction.

20. The method of claim 1, wherein the additional display region comprises one of a plurality of additional display regions, and
wherein each of the plurality of additional display regions corresponds to a different motion of the mobile device.

21. The method of claim 1, wherein the menus, widgets, and files displayed in the additional display region are added to, removed from, and altered in the additional display region according to a user input.

22. The method of claim 9, where the preset condition comprises at least one of a certain period of time elapsing, a drag touch event corresponding to a drag gesture that touches and drags the additional display region toward outside of the display unit, a key input signal for removing the additional display region, and a motion for tilting the mobile device in a certain direction.

23. The apparatus of claim 10, wherein the additional display region comprises one of a plurality of additional display regions, and
wherein each of the plurality of additional display regions corresponds to a different motion of the mobile device 24. The apparatus of claim 10, wherein the menus, widgets, and files displayed in the additional display region are added to, removed from, and altered in the additional display region according to a user input.

25. A method for operating a display unit of a mobile device, the method comprising:
displaying a portion of a preset display area on a display unit;
detecting an input signal corresponding to a motion of the mobile device, wherein the detecting of the input signal comprises detecting that the motion of the mobile device comprises a tilt of the mobile device in a certain direction and acquiring a tilt detected signal corresponding to the tilted direction; and
upon detecting the input signal, shifting the preset display area in the display unit to display another portion of the preset display area from not on the display unit onto the display unit according to the motion,
wherein the additional display region comprises one of at least one additional display region each corresponding to a motion of the mobile device.

* * * * *